(12) United States Patent
Cho et al.

(10) Patent No.: US 10,230,268 B2
(45) Date of Patent: Mar. 12, 2019

(54) POWER SUPPLY AND PICKUP SYSTEM CAPABLE OF MAINTAINING STABILITY OF TRANSMISSION EFFICIENCY DESPITE CHANGES IN RESONANT FREQUENCY

(71) Applicant: Korea Advanced Institute of Science and Technology, Daejeon (KR)

(72) Inventors: Dong Ho Cho, Seoul (KR); Joung Ho Kim, Daejeon (KR); Yang Bae Chun, Daejeon (KR); Eun-Jung Kim, Daejeon (KR); Ji-Yun Ryu, Daejeon (KR); Mi-Joo Kim, Daejeon (KR); Il-Song Han, Daejeon (KR); Seung-Young Ahn, Daejeon (KR); Gyeng-Chul Kim, Goyang-Si (KR); Gu Ho Jeong, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1162 days.

(21) Appl. No.: 14/347,235

(22) PCT Filed: Sep. 25, 2012

(86) PCT No.: PCT/KR2012/007723
§ 371 (c)(1),
(2) Date: Jun. 23, 2014

(87) PCT Pub. No.: WO2013/048092
PCT Pub. Date: Apr. 4, 2013

(65) Prior Publication Data
US 2014/0319927 A1    Oct. 30, 2014

(30) Foreign Application Priority Data
Sep. 26, 2011    (KR) .................. 10-2011-0097190

(51) Int. Cl.
*H02J 50/10* (2016.01)
*H02J 50/12* (2016.01)
(Continued)

(52) U.S. Cl.
CPC ............... *H02J 50/10* (2016.02); *B60L 9/28* (2013.01); *B60L 11/182* (2013.01);
(Continued)

(58) Field of Classification Search
CPC ...................................... H02J 50/10
See application file for complete search history.

(56) References Cited

U.S. PATENT DOCUMENTS

| 8,105,247 B2 * | 1/2012 | Buchwald | A61B 5/0031 600/587 |
| 2013/0098724 A1 * | 4/2013 | Suh | B60L 5/005 191/10 |
| 2014/0319927 A1 * | 10/2014 | Cho | B60L 11/182 307/104 |

FOREIGN PATENT DOCUMENTS

| JP | 2003-250233 A | 9/2003 |
| KR | 10-2010-0067748 A | 6/2010 |

(Continued)

OTHER PUBLICATIONS

Huh J, Lee W, Cho GH, Lee B, Rim CT. Characterization of novel inductive power transfer systems for on-line electric vehicles. InApplied Power Electronics Conference and Exposition (APEC), 2011 Twenty-Sixth Annual IEEE 2011 Mar. 6, 2011 (pp. 1975-1979). IEEE.*

(Continued)

*Primary Examiner* — Daniel Cavallari-see
(74) *Attorney, Agent, or Firm* — Lex IP Meister, PLLC

(57) ABSTRACT

The present invention relates to a power supply and pickup system capable of maintaining stability of transmission
(Continued)

efficiency despite changes in a resonant frequency. More particularly, the present invention relates to a power supply and pickup system capable of maintaining the stability of efficiency of transmitting power to a pickup device from a power supply device even when a voltage or current changes by the variation in a resonant frequency. According to the power supply and pickup system of the present invention, Q-factor of a power supply and pickup system is set to a low value, a stability of efficiency of transmitting power to a pickup device from a power supply device is maintained even when a voltage of current changes by the variation in a resonant frequency.

2 Claims, 16 Drawing Sheets

(51) Int. Cl.
*H02J 50/40* (2016.01)
*H02J 7/02* (2016.01)
*H02J 50/70* (2016.01)
*B60L 11/18* (2006.01)
*H01F 38/14* (2006.01)
*B60L 9/28* (2006.01)
*H01F 27/36* (2006.01)
*H02J 5/00* (2016.01)
*B60M 7/00* (2006.01)

(52) U.S. Cl.
CPC ....... *B60L 11/1803* (2013.01); *B60L 11/1831* (2013.01); *B60L 11/1833* (2013.01); *B60M 7/00* (2013.01); *H01F 27/365* (2013.01); *H01F 38/14* (2013.01); *H02J 5/005* (2013.01); *H02J 7/025* (2013.01); *H02J 50/12* (2016.02); *H02J 50/40* (2016.02); *H02J 50/70* (2016.02); *B60L 2240/36* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

FOREIGN PATENT DOCUMENTS

| KR | 10-0976319 B1 | 8/2010 | |
|---|---|---|---|
| KR | 10-2010-0111212 A | 10/2010 | |
| KR | 10-1038350 B1 | 5/2011 | |
| WO | WO 2011074894 A2 * | 6/2011 | ............. B60L 5/005 |

OTHER PUBLICATIONS

International Search Report from International Application No. PCT/KR2012/007723, dated Feb. 28, 2013.

* cited by examiner

[Fig. 1]
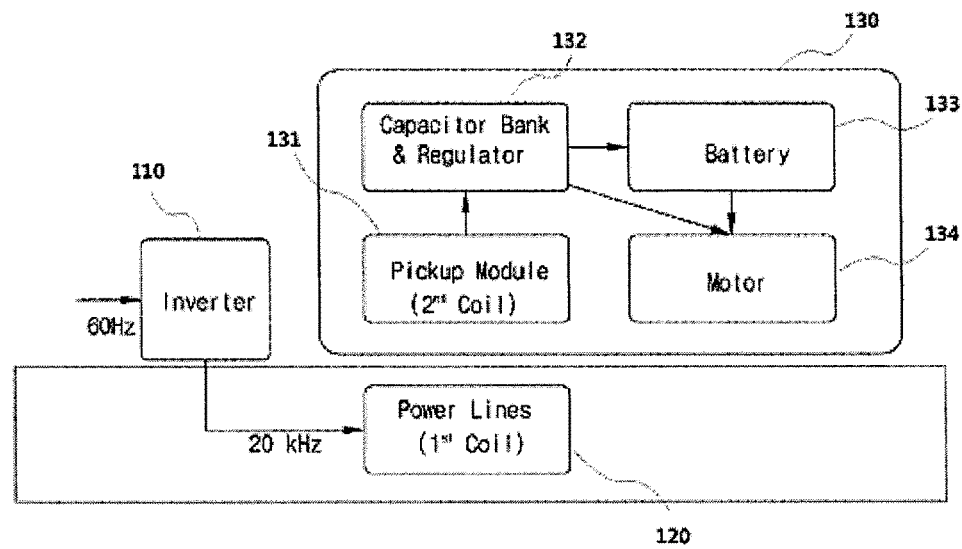
[Fig. 2]
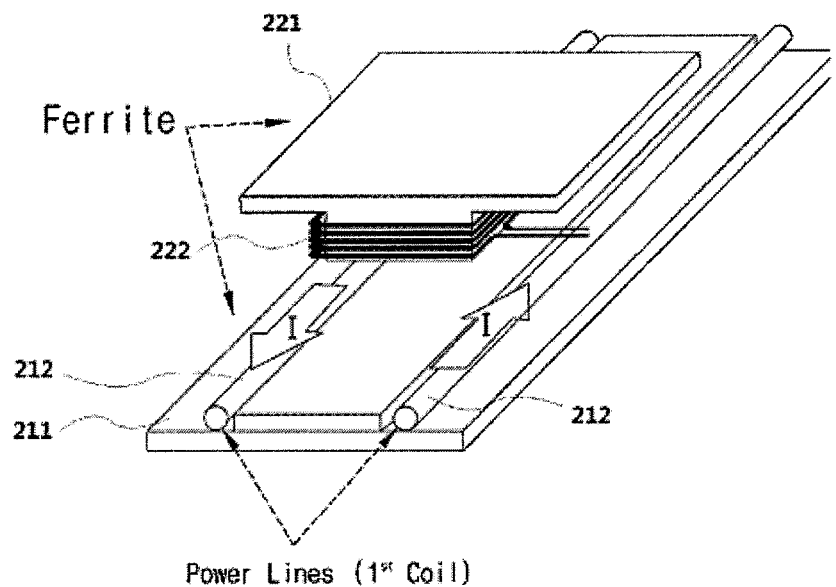

[Fig. 3]
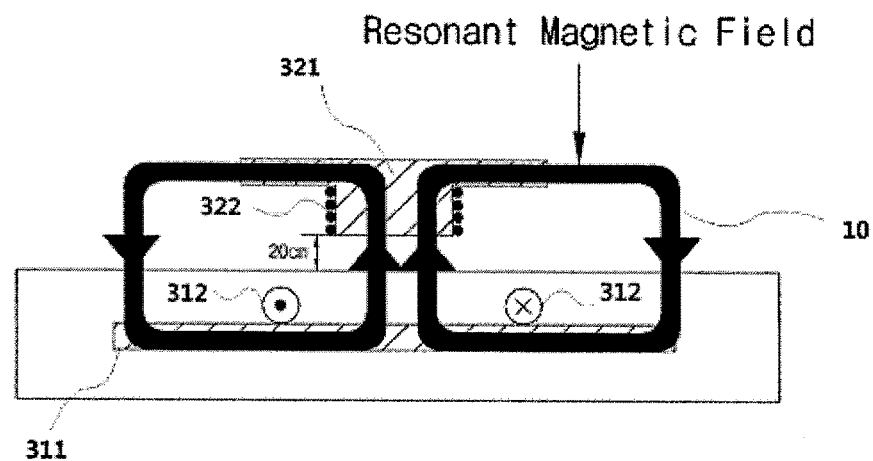
[Fig. 4]
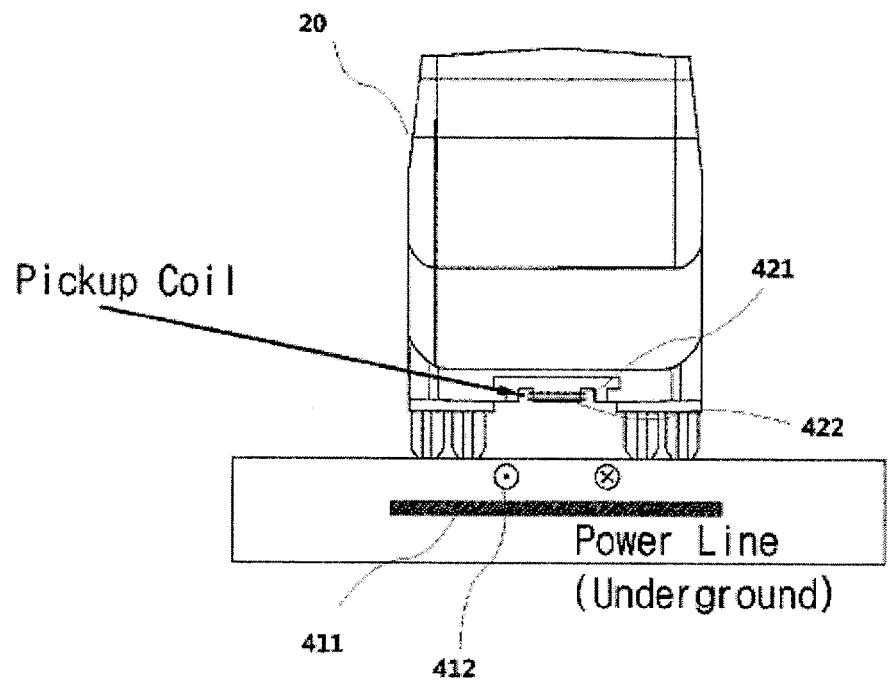

[Fig. 5]
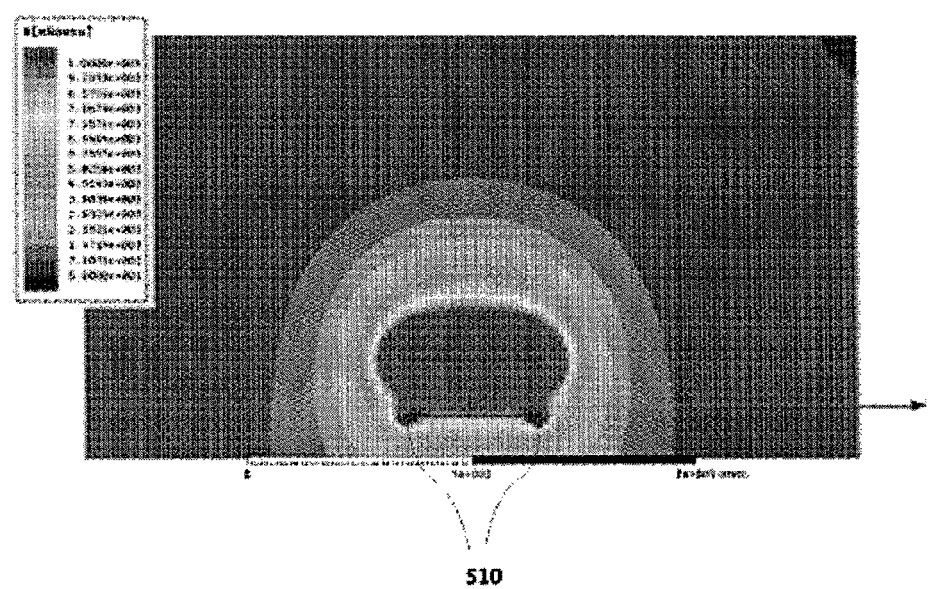
510

[Fig. 6]
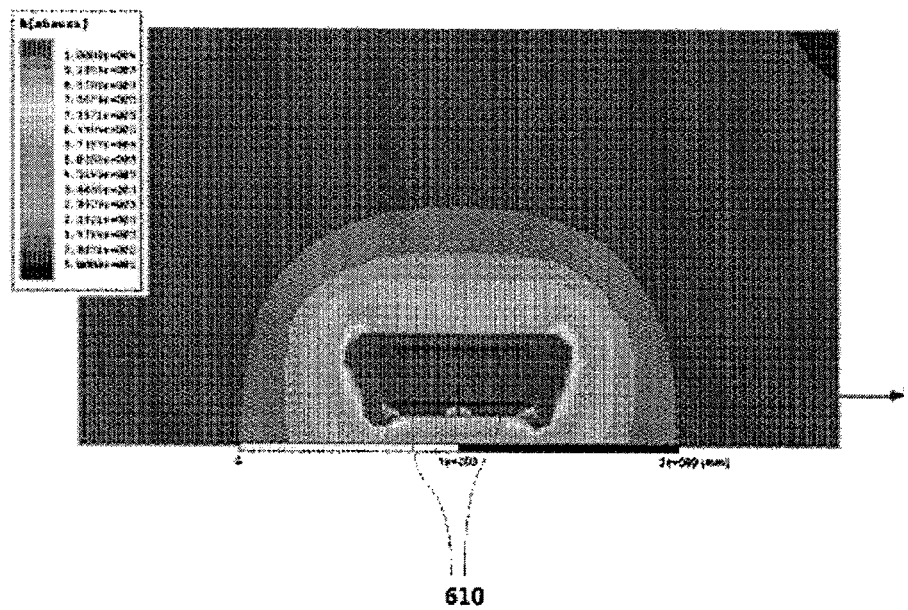
610
[Fig. 7]
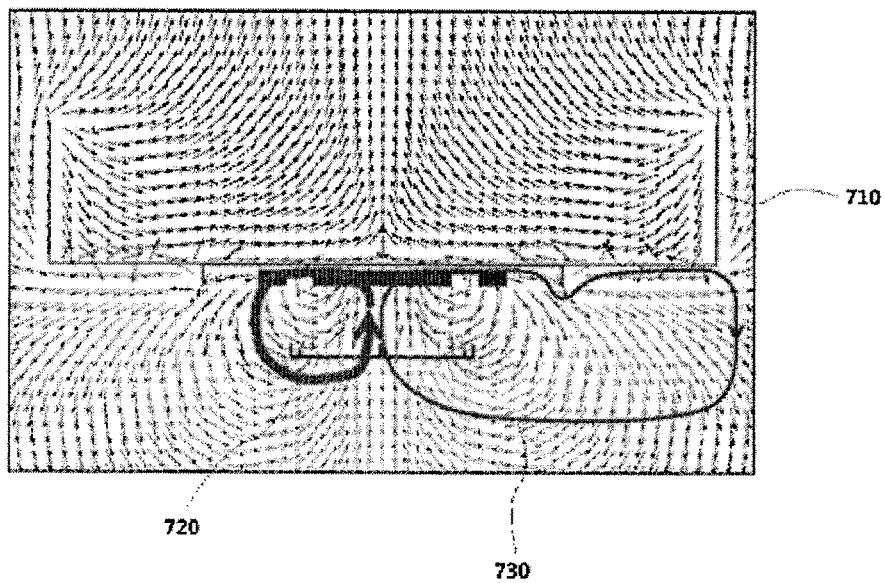
710
720
730

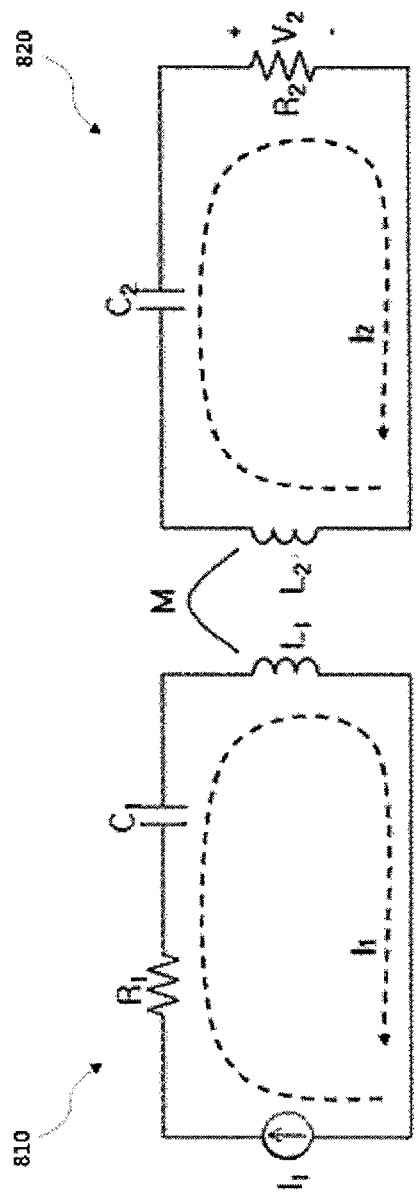
[Fig. 8]

[Fig. 9]
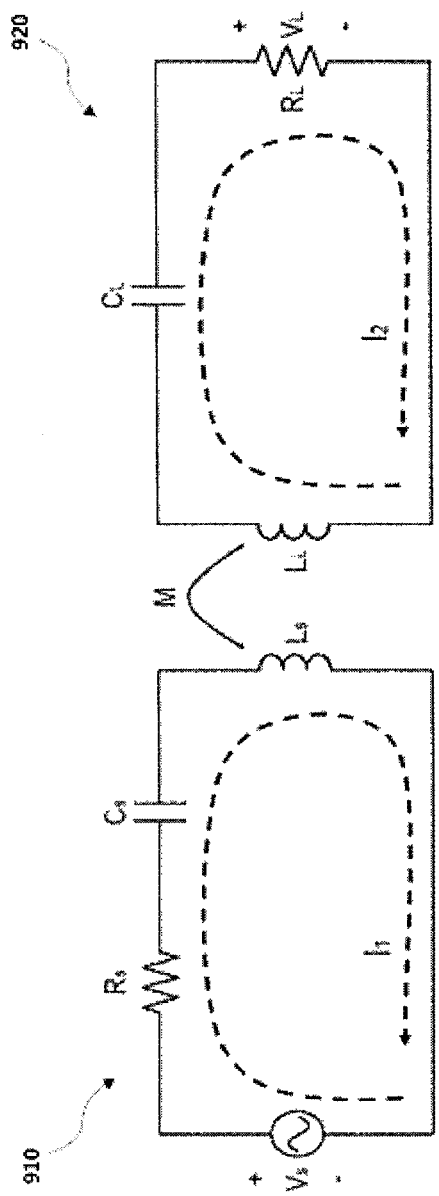

[Fig. 10]
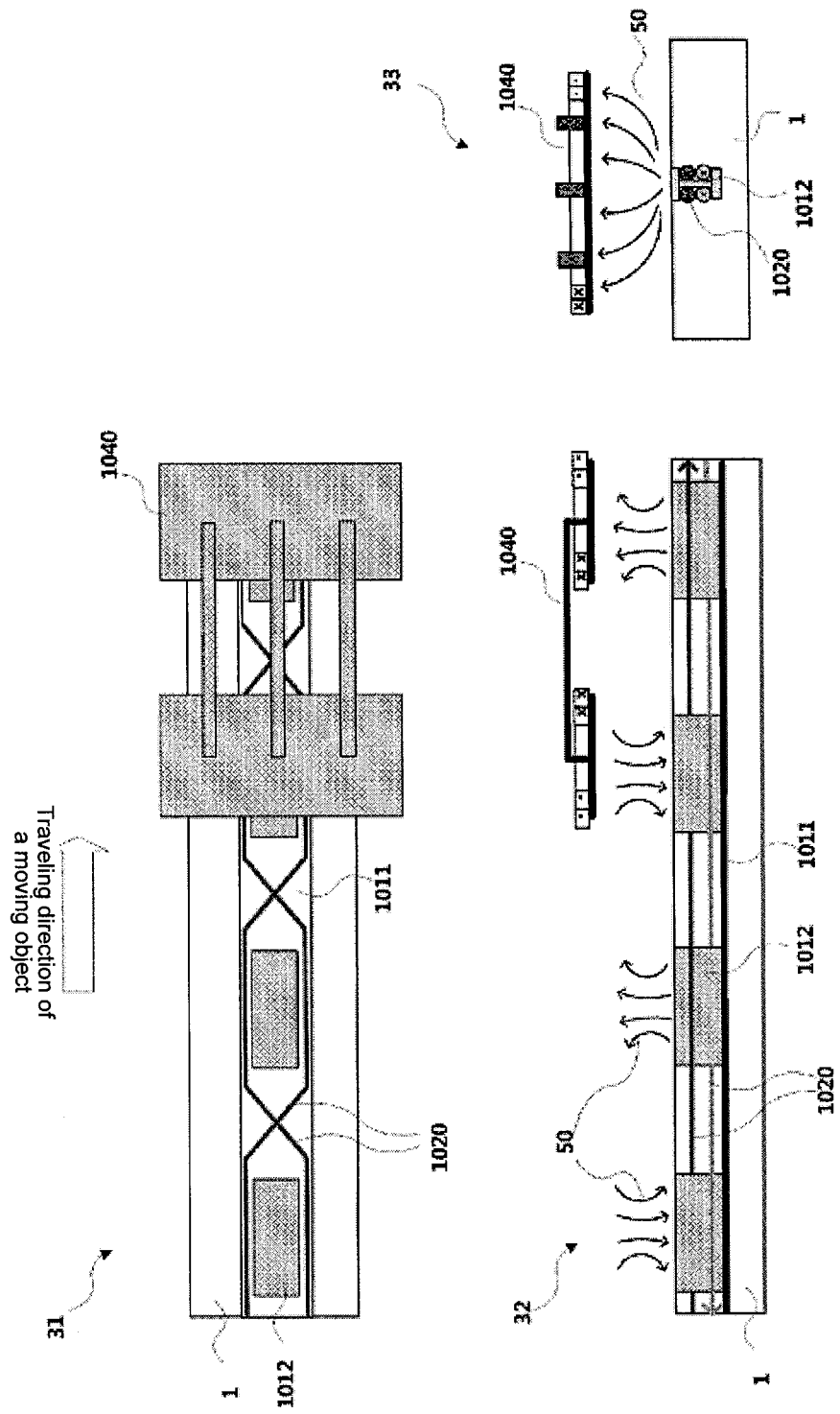

[Fig. 11]
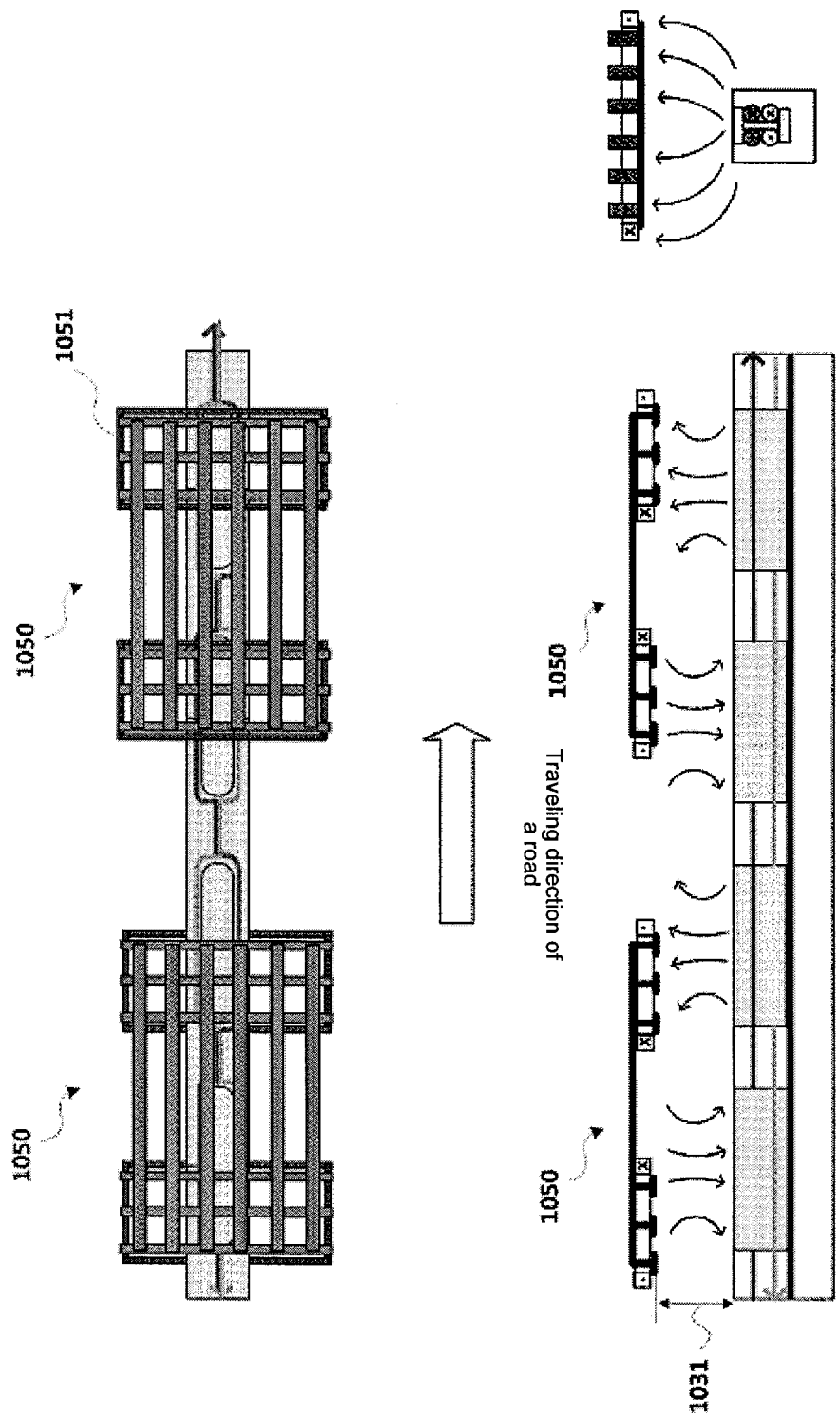

[Fig. 12]
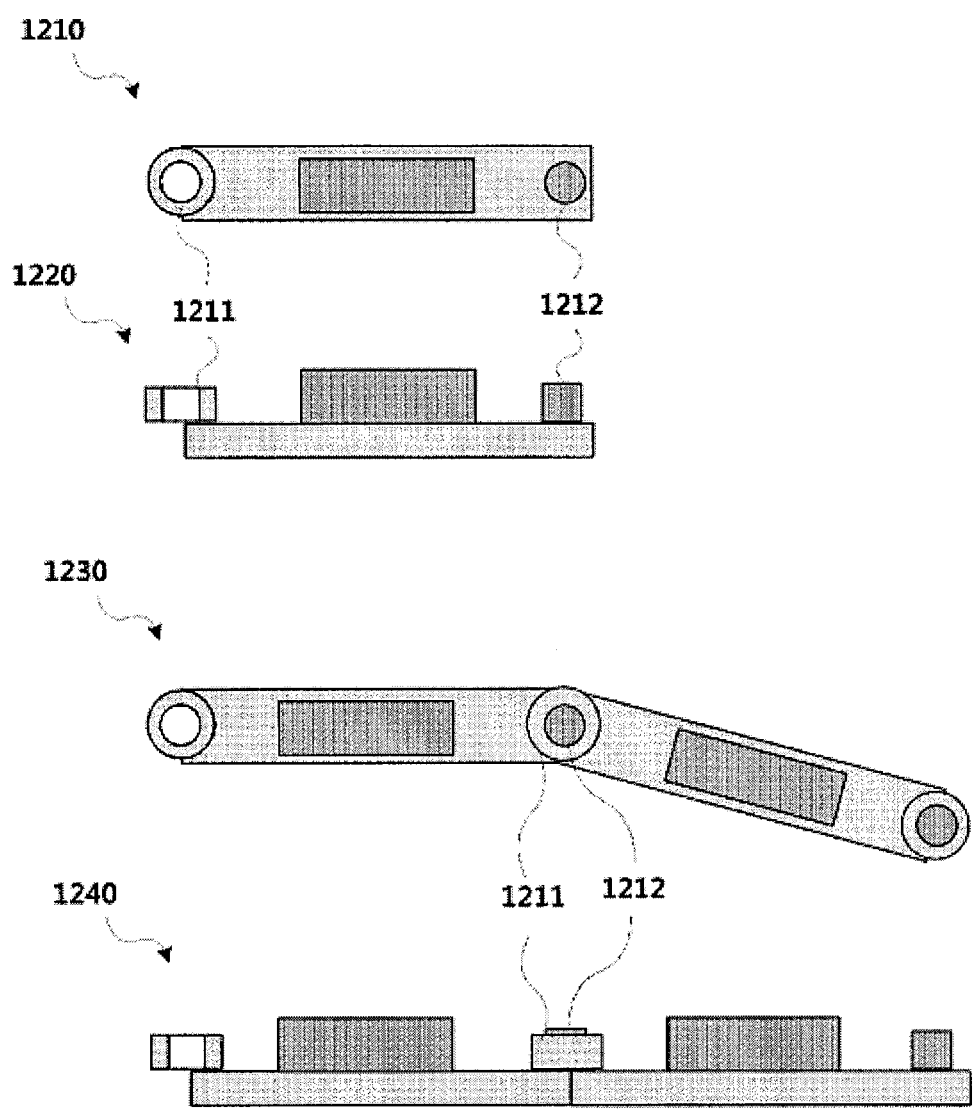

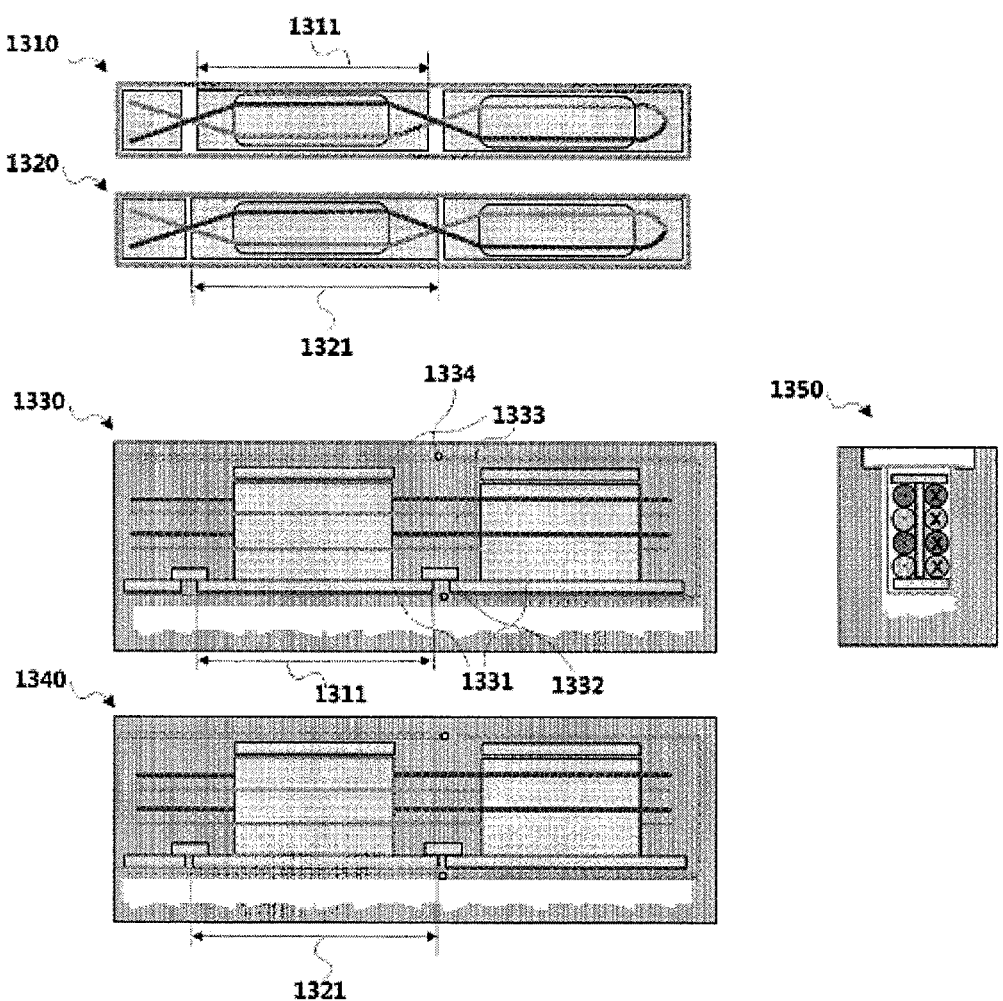
[Fig. 13]

[Fig. 14]
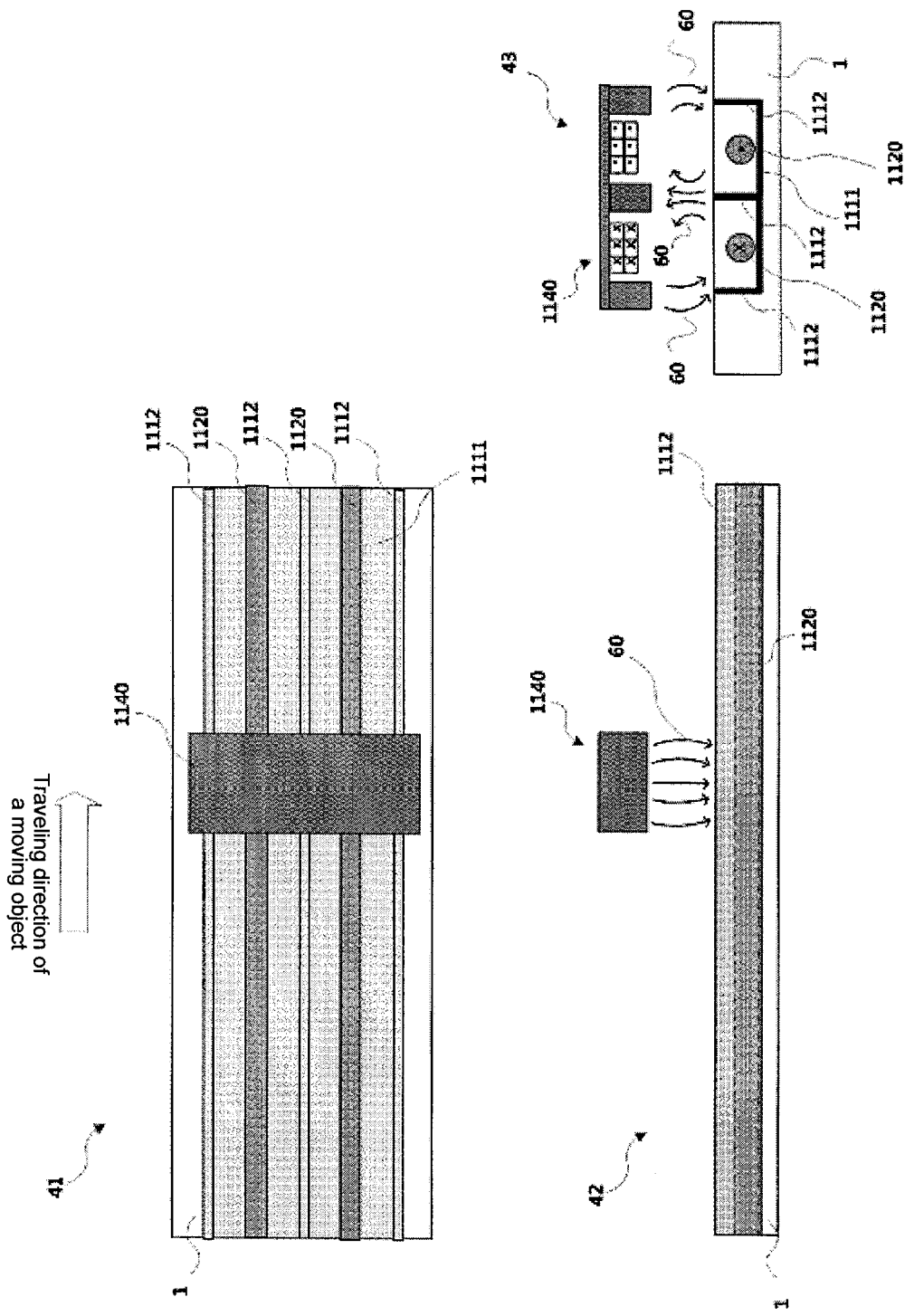

[Fig. 15]
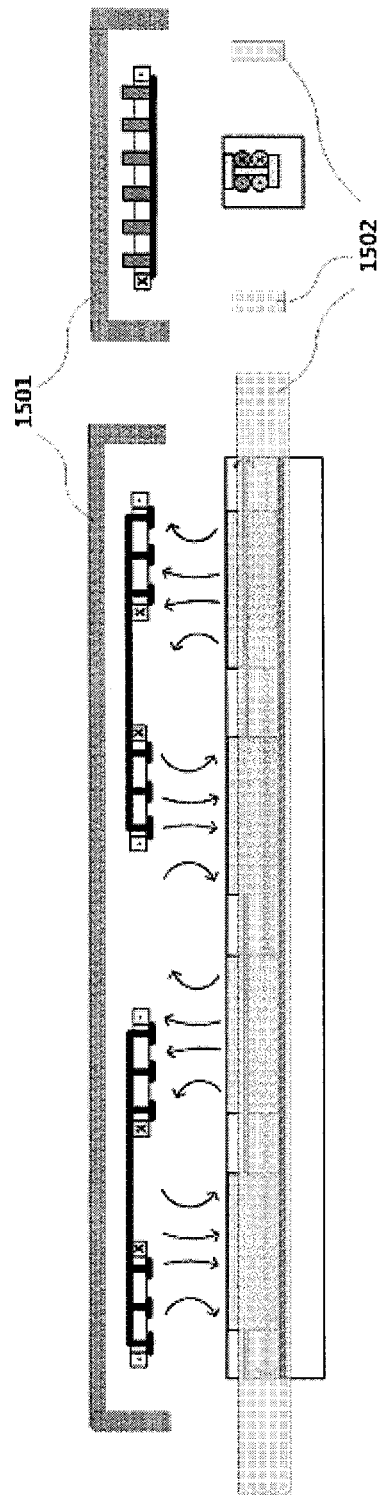

[Fig. 16]
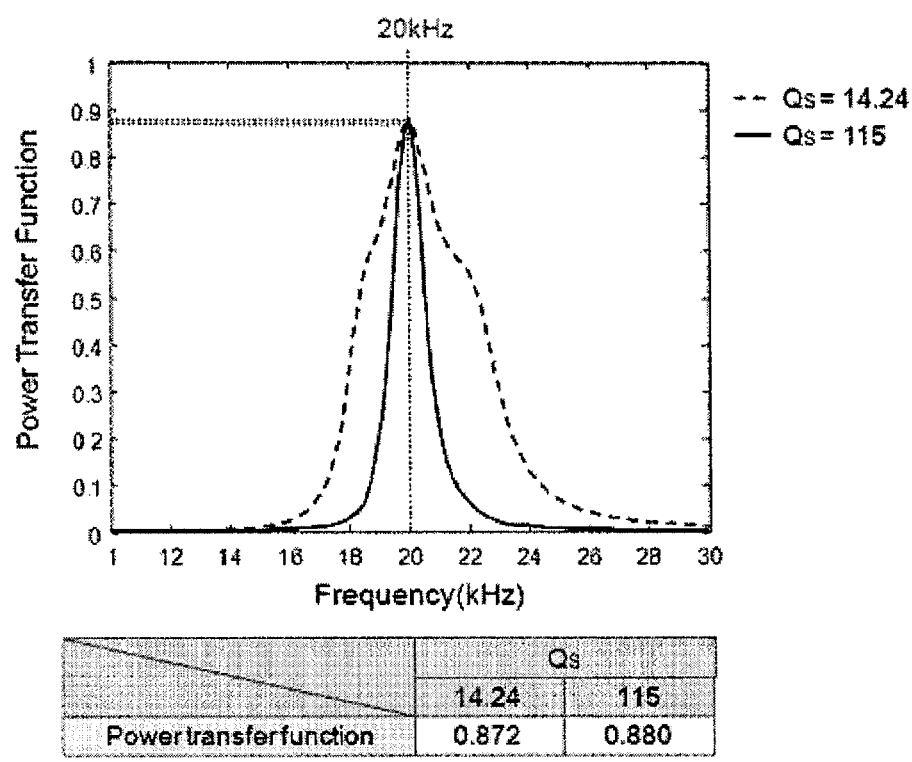

[Fig. 17]
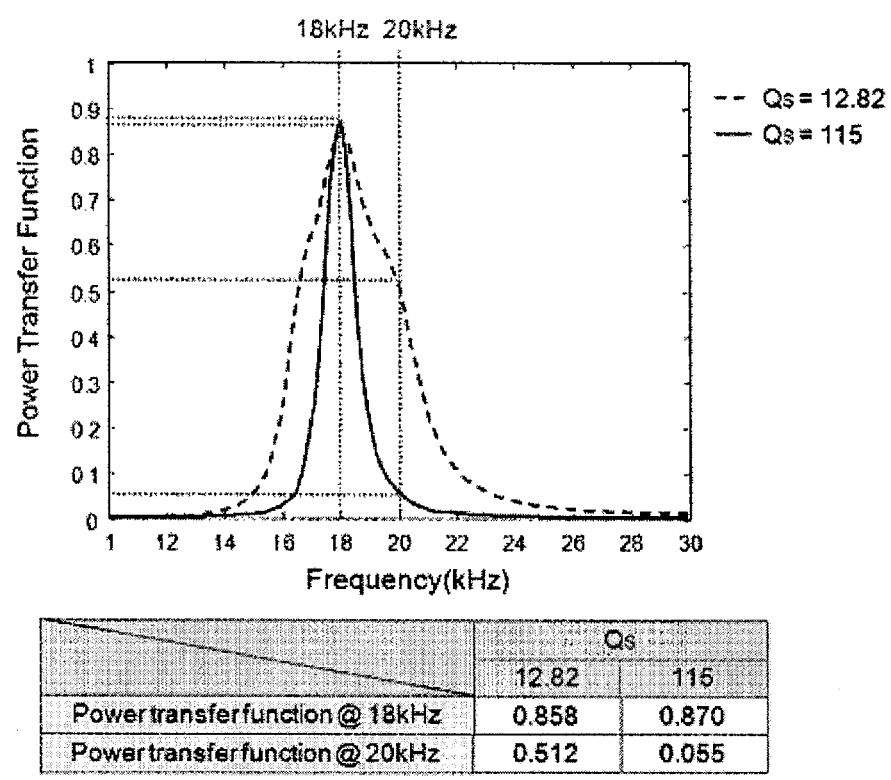

[Fig. 18]
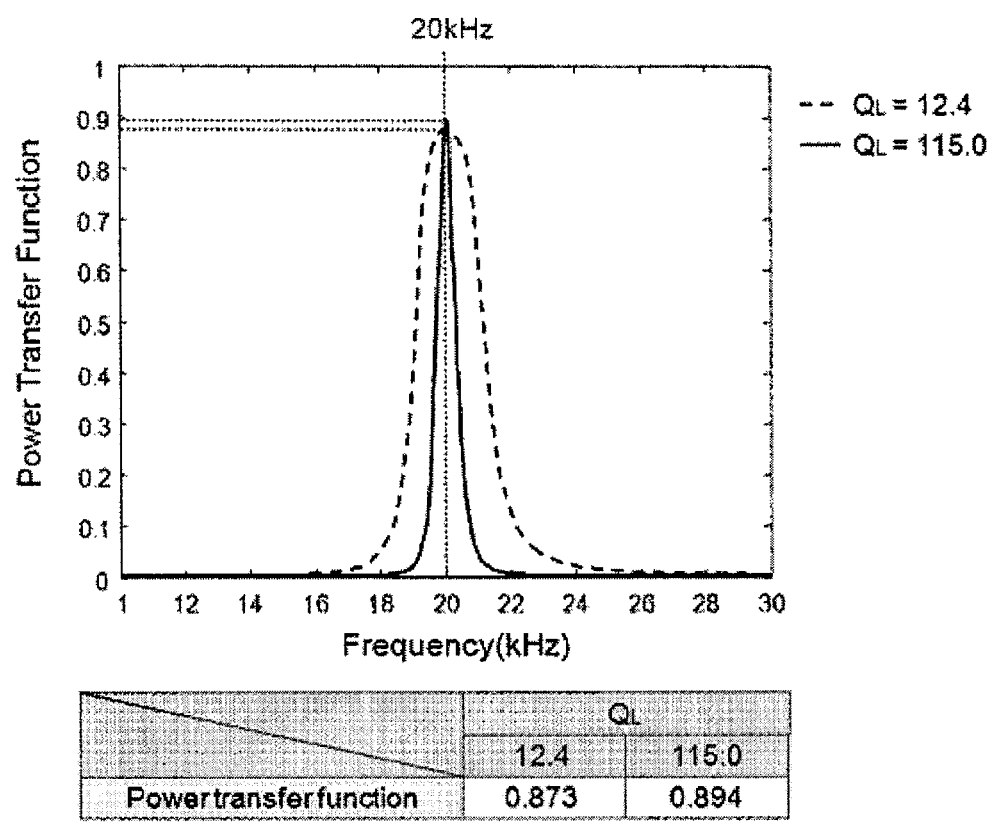

[Fig. 19]
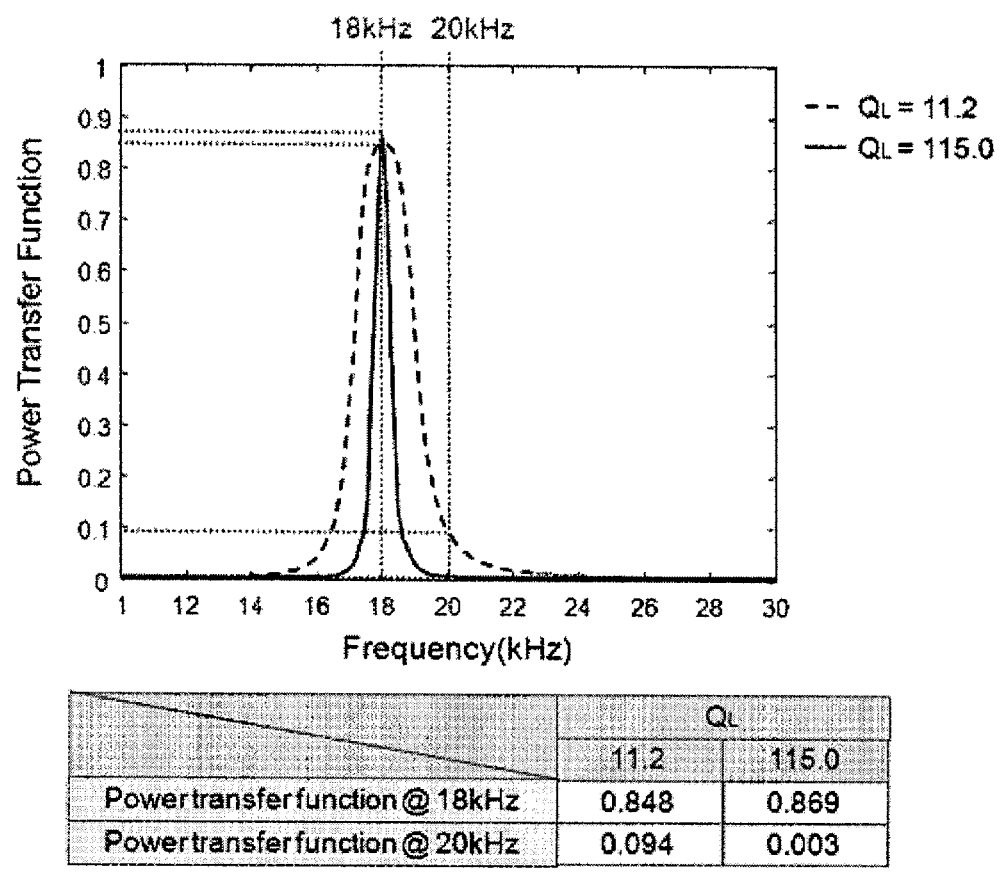

POWER SUPPLY AND PICKUP SYSTEM CAPABLE OF MAINTAINING STABILITY OF TRANSMISSION EFFICIENCY DESPITE CHANGES IN RESONANT FREQUENCY

CROSS REFERENCE TO RELATED APPLICATIONS

This application is a national stage application under 35 U.S.C. § 371 of International Application No. PCT/KR2012/007723, filed Sep. 25, 2012 and entitled "POWER SUPPLY AND PICKUP SYSTEM CAPABLE OF MAINTAINING STABILITY OF TRANSMISSION EFFICIENCY DESPITE CHANGES IN RESONANT FREQUENCY," which claims the benefit of Korean Application No. KR 10-2011-0097190, filed Sep. 26, 2011, the contents of both of which are incorporated herein by reference in their entireties.

TECHNICAL FIELD

The present invention relates to a power supply and pickup system capable of maintaining stability of transmission efficiency despite changes in a resonant frequency. More particularly, the present invention relates to a power supply and pickup system capable of maintaining the stability of efficiency of transmitting power to a pickup device from a power supply device even when a voltage or current changes due to the variation in a resonant frequency.

DESCRIPTION OF RELATED ART

For the existing wireless power transmission devices, such devices that obtain the maximum efficiency of transmitting power by correctly fixing power supply devices and pickup devices and increasing the value of Q-factor for optimum power transmission between power supply devices and pickup devices have been suggested. But the resonant frequency of system is often changed depending upon the manufacturing process or errors in the components used. Especially, for wireless power transfer electric vehicles traveling on the road with a feeder cable laid under the road while being supplied with power from the feeder cable, power supply devices are fixed but pickup devices are very hard to be correctly fixed and sometimes two or more pickup devices are installed in vehicles to pickup more power. In such cases, resonant frequency of system may be changed and the efficiency of transmitting power to a pickup device from a power supply device drops considerably.

DESCRIPTION OF THE INVENTION

Technical Task

In order to solve the abovementioned problem, the purpose of the present invention is to set Q-factor of a power supply and pickup system to a low value and provide the power supply and pickup system capable of maintaining stability of transmitting power from a power supply device to a pickup device even when a voltage or current changes due to the variation in a resonant frequency.

Means to Solve the Task

In order to achieve the abovementioned purpose, the first embodiment of the present invention provides a power supply device which supplies power using electromagnetic induction to a moving object according to the present invention including a power supply core with magnetic poles to form magnetic field in a particular direction; and a power supply coil on which current flows with neighboring magnetic poles of different polarity, and is determined by said $$Q_S = \frac{wL_S}{R_S}$$

and said w is the angular frequency of said power supply coil current, said Ls is the inductance of said power supply coil, and said Rs is the resistance of said power supply coil.

The second embodiment of the present invention provides a power supply device which supplies power using electromagnetic induction to a moving object including a power supply core which has multiple magnetic poles in parallel to a traveling direction of the moving object and arranged side by side with each other, and a power supply coil which is arranged by extension in the traveling direction of the moving body and has electricity flow so that the neighboring magnetic poles of said power supply core on the surface perpendicular to the traveling direction of the moving object have different polarity, and Q-factor by said power supply coil current is less than 100 and the Q-factor is determined by $$Q_S = \frac{wL_S}{R_S},$$

and said w is the angular frequency of said power supply coil current, said Ls is the inductance of said power supply coil, and said Rs is the resistance of said power supply coil.

The section perpendicular to the traveling direction of a moving object of said magnetic pole may have a U-shaped form and said power supply coil may be arranged in parallel to the traveling direction of a moving object in said U-shaped magnetic pole.

The section perpendicular to the traveling direction of a moving object of said magnetic pole may have two U-shaped forms adjoining each other and said power supply coil may be arranged in parallel to the traveling direction of a moving object in each of said U-shaped magnetic poles.

Said power supply core may have a form in which power supply modules having multiple magnetic poles in parallel to the traveling direction of a moving object and arranged side by side with each other are arranged in series in the traveling direction of a moving object.

The third embodiment of the present invention provides a power supply device which supplies power using electromagnetic induction to a moving object including a power supply core which has more than one magnetic pole arranged in series in the traveling direction of a moving body, and a power supply coil which is arranged in parallel to the traveling direction of a moving body on the left and right side of said magnetic poles and intersected with each other between said magnetic poles and has electricity flow so that the neighboring magnetic poles of said power supply core in the traveling direction of a moving object have different polarity, and said Q-factor is determined by $$Q_S = \frac{wL_S}{R_S}$$

and said w is the angular frequency of said power supply coil current, said Ls is the inductance of said power supply coil, and said Rs is the resistance of said power supply coil.

The section perpendicular to the traveling direction of a moving object of said magnetic pole has a T-shaped form, it is desirable that said power supply coil is arranged in parallel to the traveling direction of a moving object on the left and right side of each of said magnetic poles and intersected with each other between said magnetic poles and electricity of opposite directions flows on said power supply coils on the left and right side of each of said magnetic poles.

Said power supply device may have an additional linear magnetic shield member installed in the traveling direction.

Said power supply core may be of such a form that power supply modules which have one or more magnetic poles arranged in series in the traveling direction of a moving object are arranged to make lines in series in the traveling direction of a road.

Said power supply modules may have core connection part in the front and rear ends and each of the power supply core modules may be connected to each other by said core connection part and arranged to make lines in series in the traveling direction of a road.

Said power supply core may be arranged spaced apart from each other to accept thermal expansion and thermal contraction.

Said power supply core may have fiber reinforced plastic installed in the upper or lower part.

Said power supply core may have the width perpendicular to the traveling direction of a moving object less than one half of the interval between the centers of said magnetic poles.

It is desirable that the length of said magnetic pole in the traveling direction of a moving object is more than twice of the distance between the adjoining ends of said neighboring magnetic poles.

The fourth embodiment of the present invention provides a pickup device which receives power using electromagnetic induction from a power supply device installed in the traveling direction of a moving object and is installed in a moving object, consisting of a pickup core which is installed spacing apart from a power supply device in the lower part of a moving object, and a power supply coil which is installed in a loop form in said pickup core to allow current induced from a power supply device to flow, and Q-factor by said pickup coil current is less than 100 and said Q-factor is determined by $$Q_S = \frac{wL_S}{R_S}$$

said w is the angular frequency of said power supply coil current, said Ls is the inductance of said power supply coil, and said Rs is the resistance of said power supply coil.

Said pickup core may be of a plate form or lattice form.

Said pickup device may have an additional loop-type magnetic shield member installed around a pickup core.

Effect of the Invention

According to the present invention, it has an effect of providing a power supply and pickup system capable of maintaining stability of efficiency of transmitting power to a pickup device from a power supply device even when a voltage or current changes due to the variation in a resonant frequency by setting Q-factor of a power supply and pickup system to a low value.

BRIEF DESCRIPTION OF THE SEVERAL VIEWS OF THE DRAWING

Drawing 1 shows a configuration of wireless power transmission system for electric vehicle.

Drawing 2 shows a mimetic diagram of a power supply device and a pickup device.

Drawing 3 shows a cross-sectional view at the front of a power supply device and a pickup device.

Drawing 4 shows a cross-sectional structure of a pickup device applied to an electric vehicle.

Drawing 5 shows a magnetic field distribution when a technology of shaped magnetic field in resonance is not applied.

Drawing 6 shows a magnetic field distribution when a technology of shaped magnetic field in resonance is applied.

Drawing 7 shows a magnetic field distribution with magnetic flux density vectors after a technology of shaped magnetic field in resonance is applied.

Drawing 8 shows an equivalent circuit of wireless power transmission system with a current source as a power source of a power supply device.

Drawing 9 shows an equivalent circuit of wireless power transmission system with a voltage source as a power source of a power supply device.

Drawing 10 shows a structure of an I-shaped power supply device.

Drawing 11 shows an embodiment in which pickup cores in a pickup device are configured in a lattice-type.

Drawing 12 shows a power supply device modularized into the size of a magnetic pole interval to be easily installed in a curved road.

Drawing 13 shows an embodiment of a structure which copes with the problem of expansion and contraction of a power supply device according to temperature change of a power supply device.

Drawing 14 shows a structure of a W-shaped power supply device.

Drawing 15 shows a magnetic shield method of an I-shaped power supply and pickup device.

Drawing 16 shows transmission efficiency for the Q-factor ($Q_s$) of a power supply device with current signal of 20 kHz applied as operating frequency when a resonant frequency of a power supply and pickup system is 20 kHz.

Drawing 17 shows transmission efficiency for the Q-factor ($Q_s$) of a power supply device with current signal of 20 kHz applied as operating frequency when a resonant frequency of a power supply and pickup system is 18 kHz.

Drawing 18 shows transmission efficiency of the Q-factor ($Q_L$) of a pickup device with current signal of 20 kHz applied as operating frequency when a resonant frequency of a power supply and pickup system is 20 kHz.

Drawing 19 shows transmission efficiency of the Q-factor ($Q_L$) of a pickup device with current signal of 20 kHz applied as operating frequency when a resonant frequency of a power supply and pickup system is 18 kHz.

THE BEST FORM FOR EMBODIMENT OF THE INVENTION

From now on, desirable embodiments of the present invention will be described in detail on reference to the attached drawings. Note that the terms or words used in the present specifications and the claims should not be limited to common or lexical meanings but interpreted in such meanings and concepts corresponding to the technical idea of the present invention based on the principle that the inventor is able to properly define the concepts of terms to explain his or her invention using the best method. Therefore, since the embodiments stated in the present specifications and the configurations indicated in the drawings are merely the most desirable embodiments of the present invention but do not represent all the technical ideas of the present invention, it should be understood that there might be various equivalences and variations which can substitute for them.

Drawing 1 shows a configuration of wireless power transmission system for electric vehicle.

The power (60 Hz in the drawing) generated by an electric power company is applied to the inverter which generates an electrical current of wireless power transmission frequency (20 kHz in the drawing). The generated current flows through a power supply coil (120) of the power supply device. This results in magnetic field generated, and part of the generated magnetic field generates electric power due to a pickup coil in the pickup device (131). The generated power goes through a regulator (132) and is used to charge a battery (133) and drive a motor (134).

More specifically, an inverter (110), the source of power supply, functions to generate signals of wireless power transmission frequency band. In the power supply device which transmits power wirelessly, the power supply coil (120) acts as a kind of a transmission antenna; also, the power supply device must come with the SMFIR (shaped magnetic field in resonance) technology which decides the shape of magnetic field through metallic magnetic material or nonmetallic magnetic material such as ferrite. The core element of the pickup device (131) is the pickup coil and since a pure pickup coil alone is hard to make the path of magnetic field as it desires in the pickup device, the SMFIR technology would be applied by the pickup core using metallic or nonmetallic magnetic material, likewise the power supply device. For electric vehicles, load consists of a motor (134) or a battery (133) and consumes the generated power.

Drawing 2 is a mimetic diagram of a power supply device and a pickup device.

When the electric current flows in a power supply coil (212) on a power supply core (211) buried underground, magnetic field is generated. When the generated magnetic field passes through a pickup coil (222) coiled around a pickup core (221) of the pickup device, voltage is induced at both ends of the pickup coil (induced electromotive force). Therefore, when resistive loads such as batteries or motors are connected to both ends of the pickup device, power is consumed at the loads.

Drawing 3 shows a cross-sectional view in front of a power supply device and a pickup device.

If a power supply core (311) of the power supply device is flat as shown in the drawing and hard to concentrate the paths of magnetic field into a particular direction, the magnetic field generated from a power supply coil (312) buried underground passes through a pickup coil (322) and forms a large loop on the whole as indicated by arrow 10. In this case, the capability of transferring power concentrated in the pickup device declines. The power supply core (311) and the power pickup core (321) which controls the transfer direction of magnetic field may use ferrite. Like this, magnetic field shape control using magnetic ferrite is an essential element for the SMFIR technology.

Drawing 4 shows a cross-sectional structure of a pickup core (421) and a pickup coil (422) applied to an electric vehicle (20).

Under the road, a flat power supply core (411) and a flat power supply coil (412).

Drawing 5 shows a magnetic field distribution when the SMFIR technology is not applied.

When the SMFIR technology is not applied, magnetic field is shaped in 360 degrees around a power supply coil (510) where the electric current flows and the whole magnetic field is equal to the sum of the magnetic field generated by each of the electric wires. The power supply device (transmission coil) and the pickup device (receiving coil) have rounded magnetic fields, resulting in the distribution of magnetic field with two circles adjoining each other.

Drawing 6 shows a magnetic field distribution when the SMFIR technology is applied.

When the SMFIR technology using magnetic material is applied, magnetic field is not radiated in 360 degrees; if there is magnetic material, magnetic field is well formed; otherwise, magnetic field is not well formed. As shown in the drawing below, the reason why magnetic field is formed flatways at some position (610) is because there is magnetic material. This technology fundamentally functions to enhance the capacity and efficiency of transmitting power by creating the path to transfer power through shaping magnetic field. In addition, like such a case that a pickup device is installed in the lower part of a vehicle, when a pickup device is installed in a limited space (height), it can be prevented that magnetic field spreads in all directions and affects other devices or materials. Therefore, eddy current caused by magnetic leakage field and the subsequent heat generation can be avoided and effects of magnetic field on human body can be minimized.

Drawing 7 Shows a Magnetic Field Distribution With Magnetic Flux Density Vectors After the SMFIR Technology is Applied After the SMFIR technology is applied, magnetic field does not spread in all directions but follow the shaped path. The drawing below shows a magnetic field distribution with vectors after the SMFIR technology is applied to a power supply device and a pickup device. An upward U-shaped structure (710) is a metal plate of car body. When a pickup device is installed in the lower part of the car, the SMFIR technology must be applied to prevent magnetic field from directly entering the car. When magnetic field enters a metal plate perpendicularly, heat is generated by eddy current, which is a big limitation for such a system that uses high electric power such as a car. When the SMFIR technology is applied, there is a great advantage that magnetic field can be shaped not to enter a metal plate.

A thick arrow (720) on the left among the arrows arranged in the shape of loop indicates the path of magnetic field transferred to a pickup device from a power supply device. Like this, the SMFIR technology can be used to make the path of magnetic field in such a shape that is desired by the designer, so that capacity and efficiency of pickup device may increase and magnetic leakage field indicated in high level at a thin arrow (730) on the right decrease, resulting in the reduced effect of magnetic field on human body.

Drawing 8 shows an equivalent circuit of wireless power transmission system with a current source as a power source of a power supply device and Drawing 9 shows an equivalent circuit of wireless power transmission system with a voltage source as a power source of a power supply device From now on, an equation to calculate a power transfer function is deduced based on Drawing 9.

The circuit on the left (910) shows an equivalent circuit of a power supply device and the circuit on the right (920) shows an equivalent circuit of a pickup device. We assume that the Q-factor of an equivalent circuit of a power supply device is Qs and the Q-factor of an equivalent circuit of a pickup device is $Q_L$.

In the equivalent circuit of a power supply device (910), $$\left(R_S + \frac{1}{jwC_S} + jwL_S\right)I_1 - jwMI_2 - V_S = 0 \qquad \text{Equation 1}$$

In the equivalent circuit of a pickup device (920), $$\left(R_L + \frac{1}{jwC_L} + jwL_L\right)I_2 - jwMI_1 = 0 \qquad \text{Equation 2}$$

From Equation 2

$$I_1 = \frac{R_L + \frac{1}{jwC_L} + jwL_L}{jwM} I_2 \qquad \text{Equation 3}$$

By substituting Equation 3 into Equation 1, $$I_2 = \frac{jwM}{\left(R_S + \frac{1}{jwC_S} + jwL_S\right) \times \left(R_L + \frac{1}{jwC_L} + jwL_L\right) + w^2 M^2} V_S \qquad \text{Equation 4}$$

can be obtained.

Meanwhile, the electric power of the equivalent circuit of a pickup device (920) can be obtained from the following equation $$P_L = I_2^2 \times R_L$$

and by substituting Equation 4 into this equation, we can obtain $$P_L = \left| \frac{-w^2 M^2}{\left[\left(R_S + \frac{1}{jwC_S} + jwL_S\right) \times \left(\left(R_L + \frac{1}{jwC_L} + jwL_L\right) + w^2 M^2\right)\right]^2} \right| V_S^2 R_L \qquad \text{Equation 5}$$

Meanwhile, the electric power of the equivalent circuit of a power supply device (910) can be obtained from the following equation $$P_s = I_1 \gt V_s$$

and by substituting Equations 3 and 4 into this equation, we can obtain $$P_S = \frac{R_L + \frac{1}{jwC_L} + jwL_L}{\left(R_S + \frac{1}{jwC_S} + jwL_S\right) \times \left(\frac{R_L + \frac{1}{jwC_L} +}{jwL_L}\right) + w^2 M^2} V_S^2 \qquad \text{Equation 6}$$

From this, K, wireless power transfer function from a power supply device to a pickup device, is deduced from $$K = \frac{P_L}{P_S} = \frac{w^2 M^2 R_L}{\left[\begin{pmatrix} R_S + \frac{1}{jwC_S} + \\ jwL_S \end{pmatrix} \times \\ \begin{pmatrix} R_L + \frac{1}{jwC_L} + \\ jwL_L \end{pmatrix} + w^2 M^2 \right] \left(R_L + \frac{1}{jwC_L} + jwL_L\right)} \qquad \text{Equation 7}$$

From this equation $$K = \frac{w^2 M^2 R_L}{\left[\begin{pmatrix} R_S + \frac{1}{jwC_S} + \\ jwL_S \end{pmatrix} \times \\ \begin{pmatrix} R_L + \frac{1}{jwC_L} + \\ jwL_L \end{pmatrix} + w^2 M^2 \right] \left(R_L + \frac{1}{jwC_L} + jwL_L\right)} \qquad \text{Equation 7}$$

$$\frac{1}{\left[\left(\frac{R_S}{wM} + \frac{jwL_S}{wM}\left(1 - \frac{1}{w^2 L_S C_S}\right)\right) \times \left(\frac{R_L}{wM} + \frac{jwL_L}{wM}\left(1 - \frac{1}{w^2 L_L C_L}\right)\right) + 1\right]\left(1 + \frac{1}{jwR_L C_L} + jw\frac{L_L}{R_L}\right)}$$

To this equation,
apply Q-factor $$Q_{MS} = \frac{wM}{R_S}, Q_{ML} = \frac{wM}{R_L}, Q_S = \frac{wL_S}{R_S}, Q_L = \frac{wL_L}{R_L}$$

and apply a resonance frequency of the equivalent circuit of a power supply device (910) and that of a pickup device (920)

$$w_{OS} = \frac{1}{\sqrt{L_S C_S}}, w_{OL} = \frac{1}{\sqrt{L_L C_L}},$$

then we can obtain $$K = \frac{1}{\left[\frac{1}{Q_{MS}Q_{ML}} \times \left(1 + jQ_S \times \left(1 - \frac{w_{OS}^2}{w^2}\right)\right) \times \left(1 + jQ_L \times \left(1 - \frac{w_{OL}^2}{w^2}\right)\right) + 1\right]\left(1 + jQ_L \times \left(1 - \frac{w_{OL}^2}{w^2}\right)\right)} \quad \text{Equation 8}$$

Meanwhile,
$M=\sqrt{L_S L_L}$ is established, where k is coupling coefficient indicating how much Ls and L_L are connected. From this, $$Q_{MS} \cdot Q_{ML} = \frac{wM}{R_S} \cdot \frac{wM}{R_L} = \frac{w^2 M^2}{R_S R_L} = \frac{w^2 k^2 L_S L_L}{R_S R_L} = k^2 \frac{wL_S}{R_S} \frac{wL_L}{R_L} = k^2 \cdot Q_S \cdot Q_L$$

is established. When it is substituted into Equation 8, $$K = \frac{1}{\left[\frac{1}{k^2 Q_S Q_L} \times \left(1 + jQ_S \times \left(1 - \frac{w_{OS}^2}{w^2}\right)\right) \times \left(1 + jQ_L \times \left(1 - \frac{w_{OL}^2}{w^2}\right)\right) + 1\right]\left(1 + jQ_L \times \left(1 - \frac{w_{OL}^2}{w^2}\right)\right)} \quad \text{Equation 9}$$

is established.

Drawing 10 shows a structure of an I-shaped power supply device.

A power supply device supplies the electric power to a moving object by magnetic induction and a pickup device is attached to a moving object to pick up the electric power from the power supply device by magnetic induction and charge batteries, etc. In this drawing, a top view (31), a side view (32) and a front view (33) of an I-shaped power supply device and a pickup device which picks up the electric power from the power supply device are illustrated in the form of cross-sectional diagram.

This drawing shows an embodiment of an I-shaped power supply device where the power supply device is buried under the road (1).

The I-shaped power supply device consists of a power supply core (1011) which has multiple magnetic poles (1012) arranged in series in the traveling direction of a moving object and a feeder cable (1020) which is placed so that each of the neighboring magnetic poles (1012) of said power supply core have different polarity from each other in the traveling direction of a moving object, that is, the N pole and the S pole are generated in turn. In the embodiment of this drawing, the electric current of opposing directions flow on two feeder cables (1020) and accordingly as shown in a side view (32), magnetic field (50) of opposing directions is generated upwards from the consecutive magnetic poles (1012) and the N pole and the S pole are generated in turn. In this way, the electric power is supplied to the moving object traveling on the road via magnetic induction, and a pickup device (1040) picks up the electric power from it. 'I-shaped' means that the cross-section of the magnetic pole (1012) as shown in the front view (33) looks I-shaped. Of course, other shapes with slight changes or improvements are also available and collectively referred to as an 'I-shaped'.

It is desirable that for said power supply core, as shown in the drawing, the width perpendicular to the traveling direction of a moving object is less than one half of the intervals between the centers of said magnetic poles. As abovementioned, when an I-shaped magnetic pole is applied as shown in the drawing, the width of magnetic pole can significantly decrease and the N and S pole is generated in turn in the traveling direction of the road, so that EMF at both ends of feeder cable can significantly decrease and feeder cable installation cost can decrease. Besides, the distance between the buried power supply device and the pickup device installed in the lower part of a car, that is a gap interval (1031, see Drawing 11), can be maintained to be more than a certain interval and the transferred electric power can be supplied properly. In addition, with a narrow width of feeder cable using a narrow I-shaped magnetic pole, the width of the pickup device installed in a car can decrease. In such a range, if the width of the pickup device exceeds a certain value, allowable deviation to the left and right may increase comparable with the feeder cable of other structure; this allows an additional benefit of having a larger allowable deviation range in comparison with other structures.

As shown in the drawing, it is desirable that the length of said magnetic pole in the traveling direction of a moving object is more than two times of the distance between the neighboring ends of said neighboring magnetic poles.

Meanwhile, said power supply core may be configured so that power supply modules which have one or more magnetic poles arranged in series in the traveling direction of a moving object are arranged in series in the traveling direction of a moving object. That is, it may be of such a shape that power supply cores with magnetic poles are modularized and each of the modules is connected in series.

Drawing 11 shows an embodiment in which a pickup core (1051) in a pickup device (1050) is configured in a lattice-type.

This may reduce the weight of the pickup core (1051) and have an advantage in cooling and manufacturing in a mechanically sound structure. In this case, there would be no significant effect on electrical performance if the gap between the bars is as small as less than one half of the gap interval (1031).

Drawing 12 shows a power supply device modularized into the size of a magnetic pole interval to be easily installed in a curved road.

A top view (1210) and a side view (1220) of each of the power supply core modules are presented here. At both ends of the power supply core module, there are connection members of male-female structure (1211, 1212) which have large contact area in electromagnetic circuit and can be easily connected. With this configuration, the power supply module can be combined onsite and slightly turned to the left or right in certain degrees along the bent road. A top view (1230) and a side view (1240) of the combination of the power supply core module with the connection members (1211, 1212) are illustrated. Although not being illustrated in this drawing, a core module which can be installed even a bent road upwards or downwards such as a slope may be configured.

Drawing 13 shows an embodiment of a structure which is designed to solve the problem of expansion and contraction of a power supply device according to temperature change of a power supply device.

The following are presented here: a top view (1310), a side view (1330), and the length of a power supply core (1311) of such a case that a power supply device is subject to thermal contraction; and a top view (1320), a side view (1340), the length of a power supply core (1321), and a front view (1350) of such a case that a power supply device is subject to thermal expansion.

A road should bear temperature changes ranging from −20° C. to +80° C. It should be considered that magnetic materials, cables, cable protecting devices such as FRP or PVC pipe, asphalt or cement are subject to thermal expansion and have different thermal expansion coefficients. Also in this process, waterproof characteristics should be maintained to be good.

Therefore, it is important that each of the structures should be discontinued regularly in the traveling direction of the road and the access side should have waterproofing. Drawing 13 shows an example of such a case that a connection member (1332) of magnetic material same as the power supply core (1331) is installed in between the power supply cores (1331) in the traveling direction of the road. Also, FRP (fiber reinforced plastic) (1233) is cut and connected and the connecting area is treated with an O-ring (1334). The connection of FRP or PVC pipe may use such a method as contraction tube or bond connection. It is not necessary to use flexible connection members all the time and flexible connection members may be used once every several meters or hundreds of thousands of meters. Since cables are flexible in general, however, the abovementioned measures are usually unnecessary.

Drawing 14 shows a structure of a W-shaped power supply device.

In this drawing, a top view (41), a side view (42), and a front view (43) of a W-shaped power supply device and a pickup device which picks up the electric power from the W-shaped power supply device are illustrated in the form of cross-sectional view.

This drawing represents an embodiment of a W-shaped power supply device which is buried under the road (1).

A W-shaped power supply device consists of a power supply core (1111) which is arranged in parallel to the traveling direction of a moving object and has multiple magnetic poles (1112) arranged side by side, and a feeder cable (1120) which run in the traveling direction of a moving object so that the neighboring magnetic poles of said power supply core in the side perpendicular to the traveling direction of a moving object have different polarity from each other, that is, the N pole and S pole are generated in turn. In an embodiment of this drawing, as shown in the front view (43), the electric current of opposing directions flows on two feeder cables (1120) and as shown in the front view (43), the magnetic fields of opposing directions (60) are generated in the magnetic poles (1112) which are arranged in parallel to the traveling direction of a moving object and run side by side, and the N pole and S pole are generated in turn. In this way, the electric power is supplied to a moving object traveling on the road using magnetic induction and a pickup device (1140) picks up the electric power from it. 'W-shaped' means that the cross section of the power supply core (1111) including the magnetic poles (1112) as shown in a front view (43) looks W-shaped. Of course, other shapes with slight changes or improvements are also available. For example, there might be such a case where there is not magnetic pole standing in the center of the front view (43) and only two parallel magnetic poles, and accordingly, there is only a pair of N-S poles. In this case, although a power supply device look U-shaped, it is referred to as W-shaped. A W-shaped power supply device may be configured in such a shape that a power supply core of the abovementioned U-shaped power supply device is placed close to and in parallel with a moving body.

Meanwhile, said power supply core may be configured so that power supply modules which have one or more magnetic poles arranged in series in the traveling direction of a moving object are arranged in series in the traveling direction of a moving object. That is, it may be of such a shape that power supply cores with magnetic poles are modularized and each of the modules is connected in series.

Drawing 15 shows a magnetic shield method of an I-shaped power supply and pickup device.

An I-shaped pickup device is characterized by that it can be reduced by half in size compared with the width of a car and bring about a space for magnetic shield. Therefore, as shown in Drawing 15, when a loop-type magnetic shield material (1501) wraps around the device, magnetic leakage flux is subject to magnetic ground along the magnetic shield loop (1501), having an effect of magnetic shield. Magnetic shield can be performed along the sides but it can also cover the top.

For an I-shaped power supply device, magnetic poles alternating at regular intervals generate EMF for the lateral direction. With an I-shaped magnetic shield line (1502) in the length direction as shown in Drawing 15, a magnetic shield effect is exercised by longitudinal magnetic grounding.

Drawing 16 shows transmission efficiency for the Q-factor ($Q_s$) of a power supply device with current signal of 20 kHz applied as operating frequency when a resonant frequency of a power supply and pickup system is 20 kHz.

A resonant frequency of a system may be changed depending upon manufacturing process or errors of the component being used. In particular, when a pickup device moves but a power supply device is fixed as wireless charging electric car or additional pickup device collects power while there is a power supply device, a resonant frequency of a system may be changed.

This drawing shows that a resonant frequency and an operating frequency are matched (20 kHz). It is indicated that when $Q_s$ is higher than 100 ($Q_s$=115), the power transfer at operating frequency is slightly improved than when $Q_s$ is smaller than 100 ($Q_s$=14.24) (0.872→0.880; see the table below). However, when there is a difference between operating frequency and resonant frequency, the case where $Q_s$ is smaller than 100 is far more advantageous than the case where $Q_s$ is higher than 100, which is shown in Drawing 17 that will be explained below.

Drawing 17 shows transmission efficiency for the Q-factor ($Q_s$) of a power supply device with current signal of 20 kHz applied as operating frequency when a resonant frequency of a power supply and pickup system is 18 kHz.

As explained in reference to Drawing 16, when a resonant frequency of a power supply and pickup system and an operating frequency of the applied signal are matched, high power transfer function can be maintained without being highly influenced by the Q-factor but if the Q-factor is large, the frequency bandwidth becomes narrow and power transfer function is greatly influenced by operating frequency.

When referring to Drawing 17, when resonant frequency is deviated from operating frequency like this, power transfer function is higher when $Q_s$ is smaller than 100 ($Q_s$=12.82) than when $Q_s$ is higher than 100 ($Q_s$=115) at the operating frequency (20 kHz) (0.055→0.512; see the table below). Like this, when resonant frequency (18 kHz) is deviated from operating frequency (20 kHz) and fluctuates as shown in Drawing 17, power transfer function of wireless power transfer system is less sensitive when $Q_s$ is smaller than 100 ($Q_s$=12.82) than when $Q_s$ is higher than 100 ($Q_s$=115) and more stable.

Therefore, it is desirable the Q-factor value of a power supply device is smaller than 100 for the stability of power transfer function when a power supply device is fixed but a power supply and pickup device is prone to be distorted due to the movement of a pickup device as the abovementioned wireless charging electric vehicle or additional pickup device collects more power while there is a power supply device. In addition, as internal pressure which the component of high power system such as a power supply and pickup system for vehicle can bear is also important, it is desirable that the Q-factor of a power supply device is smaller than 100.

Drawing 18 shows transmission efficiency of the Q-factor ($Q_L$) of a pickup device with current signal of 20 kHz applied as operating frequency when a resonant frequency of a power supply and pickup system is 20 kHz. It shows that resonant frequency and operating frequency are matched (20 kHz). Power transfer function at operating frequency is better when $Q_L$ is higher than 100 ($Q_L$=115) than when $Q_L$ smaller than 100 ($Q_L$=12.4) (0.873→0.894, see the table below). However, when there is a difference between operating frequency and resonant frequency, power transfer sensitivity is far more advantageous when $Q_L$ is smaller than 100 than when $Q_L$ is higher than 100, which is shown in Drawing 19 that will be explained below.

Drawing 19 shows transmission efficiency of the Q-factor ($Q_L$) of a pickup device with current signal of 20 kHz applied as operating frequency when a resonant frequency of a power supply and pickup system is 18 kHz. Like this, when resonant frequency (18 kHz) is deviated from operating frequency (20 kHz), power transfer function is higher when is $Q_L$ smaller than 100 ($Q_L$=11.2) than when $Q_L$ is higher than 100 ($Q_L$=115) at the operating frequency (20 kHz) (0.003→0.094; see the table below). Like this, when resonant frequency is deviated from operating frequency (20 kHz) and fluctuates as shown in Drawing 19, power transfer function of wireless power transfer system is less sensitive when $Q_L$ is smaller than 100 ($Q_L$=11.2) than $Q_L$ is higher than 100 ($Q_L$=115) and more stable.

What is claimed is:

1. A power supply device supplying power to a moving object using magnetic induction, the power supply device comprising:
   a power supply coil which is arranged to extend in a traveling direction of the moving object and through which a current flows to form a magnetic field; and
   a power supply core adjusting a direction of the magnetic field and having a plurality of magnetic poles extended to be parallel to the traveling direction of the moving object,
   wherein the power supply core is arranged with respect to the power supply coil so that two neighboring magnetic poles of the power supply core have different magnetic polarities and a direction of the magnetic field at the magnetic poles of the power supply core is perpendicular to the traveling direction of the moving object, and
   wherein Q-factor of the power supply device is less than 100, said Q-factor is determined by $$Q_S = \frac{wL_S}{R_S},$$

wherein said w is an angular frequency of the current, said Ls is an inductance of said power supply device, and said Rs is a resistance of said power supply device,
   wherein a cross section of the power supply core perpendicular to the traveling direction of the moving object has a U-shape and said power supply coil is arranged in parallel to the traveling direction of the moving object in the power supply core.

2. A power supply device supplying power to a moving object using magnetic induction, the power supply device comprising:
   a power supply coil which is arranged to extend in a traveling direction of the moving object and through which a current flows to form a magnetic field; and
   a power supply core adjusting a direction of the magnetic field and having a plurality of magnetic poles extended to be parallel to the traveling direction of the moving object,
   wherein the power supply core is arranged with respect to the power supply coil so that two neighboring magnetic poles of the power supply core have different magnetic polarities and a direction of the magnetic field at the magnetic poles of the power supply core is perpendicular to the traveling direction of the moving object, and
   wherein Q-factor of the power supply device is less than 100, said Q-factor is determined by $$Q_S = \frac{wL_S}{R_S},$$

wherein said w is an angular frequency of the current, said Ls is an inductance of said power supply device, and said Rs is a resistance of said power supply device,
   wherein a cross section of the power supply core perpendicular to the traveling direction of the moving object has a pair of U-shapes adjoining each other and said power supply coil is arranged in parallel to the traveling direction of the moving object in the power supply core, wherein said power supply coil is disposed in each of said U-shapes.

* * * * *